UNITED STATES PATENT OFFICE.

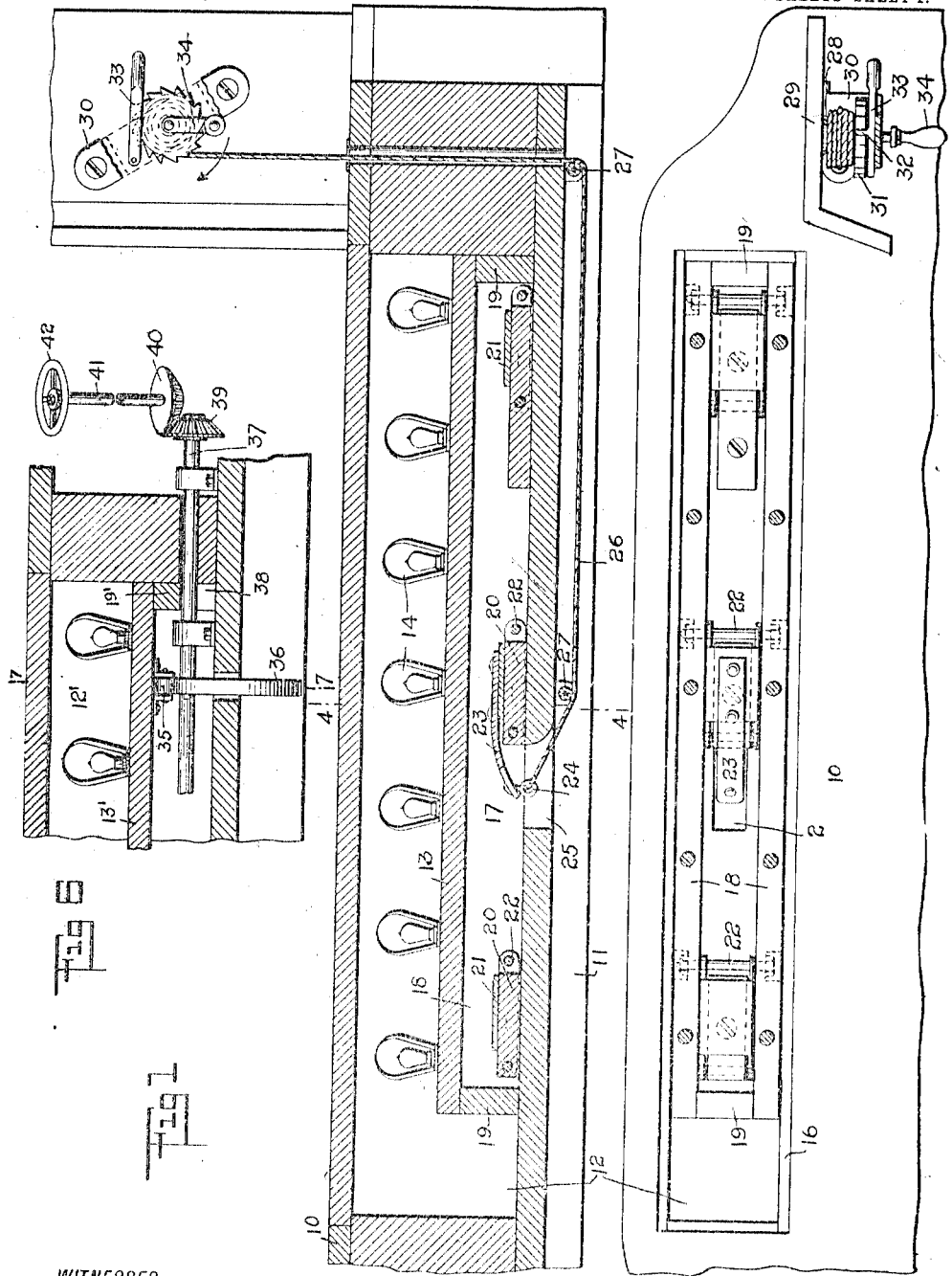

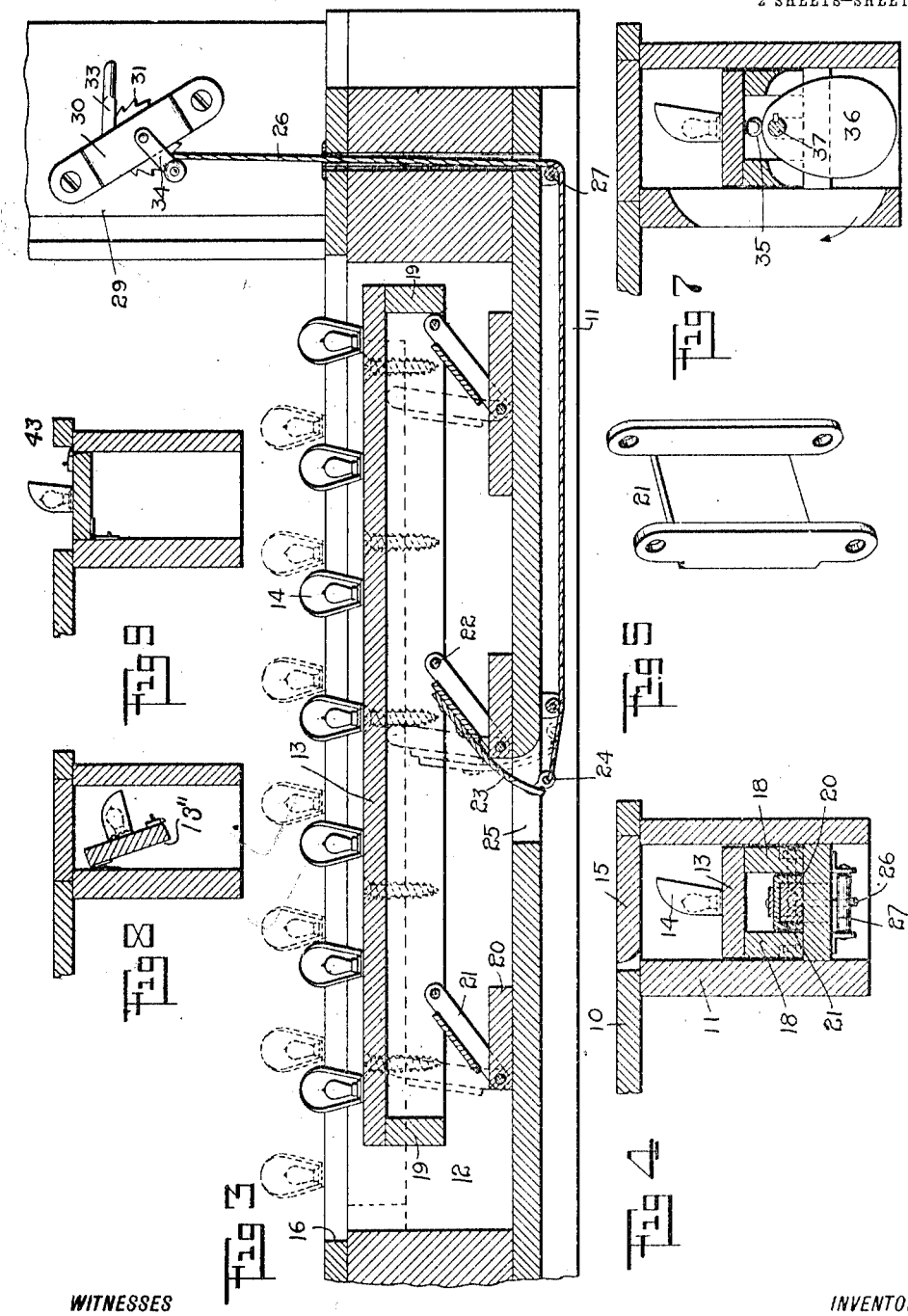

CLARENCE MILTON TAYLOR, OF LOYAL, WISCONSIN.

STAGE-FOOTLIGHTING.

1,079,195.

Specification of Letters Patent.

Patented Nov. 18, 1913.

Application filed August 1, 1913. Serial No. 782,428.

*To all whom it may concern:*

Be it known that I, CLARENCE M. TAYLOR, a citizen of the United States, and a resident of Loyal, in the county of Clark, in the State of Wisconsin, have invented a new and Improved Method of Stage-Footlighting, of which the following is a full, clear, and exact description.

My invention relates to footlights for a stage, and has reference more particularly to lamps mounted on a carrier which is slidably mounted in the structure of the stage floor, and means for adjusting the lamp carrier with reference to the floor of the stage.

Among the objects of the invention are: to provide a simple, inexpensive structure for footlights whereby a variation in the quantity of light thrown by the same on the stage can be arranged; to reduce the space occupied by the footlights; and to make it possible to utilize the entire floor space of the stage when the lights are not in use, that is, are in inoperative position.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a longitudinal section through the stage floor provided with footlights embodying my invention, the footlights being shown in inoperative position; Fig. 2 is a plan view of the stage floor where the footlights are positioned but with the lamp carrier removed and illustrating the details of construction for operating the lamp carrier; Fig. 3 illustrates a longitudinal section through the footlights showing same raised halfway from the position illustrated in Fig. 1, and also shown in dotted line when completely raised out of the pit provided in the stage floor; Fig. 4 is a transverse section on line 4—4, Fig. 1; Fig. 5 is a perspective view of one of the lengths connecting the lamp carrier to the floor structure; Fig. 6 is a portion of a longitudinal section of a stage provided with a modified form of an embodiment of my invention; Fig. 7 is a transverse section on line 7—7, Fig. 6; and Figs. 8 and 9 show a transverse section of a foot stage light operable directly from the stage, of which Fig. 8 illustrates the light in inoperative position and Fig. 9 in operative position.

Referring to the drawings, 10 represents the floor proper of a stage, which is carried on beams 11. The floor 10 is provided with a pit 12, where the footlights are generally positioned. The width of the pit 12 is sufficient to admit a lamp-carrier 13, which is slightly larger than the lamp structure 14 which it carries. The length of the pit, as shown in Figs. 1, 2 and 3, slightly exceeds the length of the carrier. The purpose of this will appear hereinafter. It is understood that the lamp-carrier 13 extends the entire width of the stage, as is the case in ordinary footlighting. The pit 12 formed in the floor is provided at its upper end adjacent the floor proper with an enlargement 16, so that the walls of the pit form a support for a cover 15 when the lamp-carrier 13 is in inoperative position, as shown in Fig. 1. When the cover 15 is in position indicated in Fig. 1, the same is flush with the floor proper 10 and thereby permits the utilization of the space generally occupied by the footlights. The cover 15 can be made in sections if desired.

The lamp-carrier 13 is provided with a recess 17, formed by side and end members 18 and 19 respectively, secured to the under surface of the member carrying the lamp structure and adjacent the end and sides of same. The floor of the pit 12, directly under the recess 17 (see Fig. 1) is provided with blocks 20 secured rigidly to the floor by any suitable means. Pivotally mounted at one end to each of the blocks are links 21, the opposite ends of which are pivotally secured to the sides 18 of the lamp-carrier 13 by means of a bolt 22. The exterior width of the link 21 is substantially equal to the width between the side members 18; while the inner width of the same is substantially equal to the width of the block 20 secured to the floor of the pit. The central link 21 (see Figs. 1 to 4 inclusive) is provided with an arm 23 rigidly secured to the link and overhanging the block 20 on which the central link 21 is mounted at the side where the link is pivoted to the block. This overhanging end of the arm 23 is provided with an eye piece 24 directed to a longitudinal opening 25 provided in the bottom of the pit. Connected to the eye piece 24 is a flexible member 26 guided under the floor of the pit by means of rollers 27 and leading to a drum 28 mounted in a suitable place 29 behind the curtains, near the electric switchboard. The drum 28 is mounted in a bracket 30 secured to the place 29, and is provided with a ratchet wheel 31 rigidly secured to the drum and adapted to engage a pawl 32 integral with the lever 33 pivotally mounted to the bracket 30. The drum 28 is provided with a crank 34 by means of which the same is operated, and whereby the lamp-carrier 13 can be adjusted in the pit as follows: to place the lamps into operative position, the cover 15 is removed and the crank 34 is turned in the direction indicated by the arrow in Fig. 1. This will cause the winding of the flexible member 26 on the drum and, consequently, a pull will be exerted on the arm 23 causing the link 21 connected thereto to rotate about its pivotal mounting in the block 20, thereby bodily moving the lamp-carrier, as shown in Fig. 3.

It is understood that other links 21 can be provided with similar arms 23 and actuated by the same flexible member as the central link illustrated in the drawing. The downward motion of the lamp-carrier, due to gravity, is prevented by the pawl 32 engaging the ratchet wheel 31. When the lamp-carrier is in the desired position, the electric switch can be turned on. It is easily seen that the adjustment can be made when current is flowing through the lamps without any interference whatsoever.

When the lamp carrier is to be placed in inoperative position, the lever 33 is raised, thereby the pawl 32 is disengaged from the ratchet 31 and the force of gravity causes the lamp carrier to descend into the pit, into position as shown in Fig. 1. The length of the pit 12 is such that when the lamp carrier is at its maximum height the link 21 is slightly inclined toward the block 20, so that when the lever 33 is disengaged from the ratchet the force of gravity will cause the lamp carrier to descend from the position shown in Fig. 6 to the position shown in Fig. 1.

In the modified form shown in Figs. 6 and 7 the length of the pit 12' is substantially equal to the length of the lamp carrier 13', in view of the fact that the motion imparted to the lamp-carrier in the pit is substantially vertical, and not horizontal and vertical combined. This is obtained by providing on the under surface of the member carrying the lamps rollers 35 engaging cams 36 rigidly secured to a shaft 37 engaging the end portions of the pit 12'. The end portions 19' of the lamp carrier are provided with a slot 38 engaged by the shaft 37 and whereby the lamp carrier is partly guided when the same is adjusted by the cams. One end of the shaft 37 projects through the end portion of the pit 12' and is provided with a beveled gear 39 rigidly secured thereto and meshing with another beveled gear 40 secured to a shaft 41 leading to a place behind the curtains and above the floor. The shaft 41 is provided with a wheel 42 whereby the shaft is operated, causing portions of the beveled gears 40 and 39, shaft 37 and cams 36 to operate, which causes the vertical movement of the lamp-carrier 13'.

As above stated, the width of the lamp carrier slightly exceeds the width of the lamp structure 14, and is about six inches wide; and the pit has substantially the same width. This structure, in comparison with the old structure of footlights, which is positioned in a depression in the floor of about two to three feet wide, gives a gain in floor space when the lights are in use; and, furthermore, as described, permits the utilization of the entire floor when the lights are not in use, that is, in inoperative position, masked in the pit.

It is understood that the lamp carrier can be made arc shape, if desired, where the front of the stage is of such construction; and any kind of light can be used in connection with my lamp carrier.

In the modified form shown in Figs. 8 and 9, a lamp carrier 13'' is hinged in the pit and provided with latchets 43 at its upper surface near the end opposite the one which is hinged, and by means of these latchets the lamp carrier is supported in operative position, as shown in Fig. 9. The lamp carrier 13'' can be made in one piece having the length of the lamp pit or can be cut in as many sections as desired. The form shown in Figs. 8 and 9 is designed for operation of the foot light directly from the stage by simply operating the latchets 43 and letting the lamp carrier 13'' drop to the position shown in Fig. 8.

Having thus described my invention, what I claim as new and desire to secure by Letters Patent is:

1. The combination of a stage floor with a footlight carrier associated therewith and provided with lamps; means for normally masking the said carrier and lamps; and means for adjusting said carrier with reference to the stage.

2. The combination of a stage floor having a pit with a footlight comprising a lamp-carrier in said pit; means for adjusting the carrier in the pit; and means for closing the pit when the footlights are in inoperative position.

3. The combination of a stage floor having a pit with footlights comprising a lamp carrier in said pit; means associated with said carrier and said pit and means leading to a point above said floor and whereby the first mentioned means are operated and said lamp carrier may be adjusted in any desired position in said pit; and means for utilizing the space normally occupied by the footlights when the same is in inoperative position.

4. The combination of a stage floor having a pit with footlights, comprising a lamp-carrier in said pit; means connecting said lamp carrier to the pit; flexible means associated with said connecting means; and means for operating said flexible means, whereby said lamp-carrier is adjusted within said pit; and means for masking the footlights when the same are in operative position.

5. The combination of a stage floor having a pit with footlights, comprising a lamp-carrier in said pit; operative means located in a predetermined position above said floor; and means connecting said lamp carrier with said operative means and whereby by the manipulation of said operative means said lamp-carrier can be maintained in any desired position in said pit.

6. The combination of a stage floor with a footlight carrier associated therewith and provided with lamps; independent means for normally masking the said carrier and lamps; and means for adjusting said carrier vertically.

In testimony whereof I have signed my name to this specification in the presence of two subscribing witnesses.

CLARENCE MILTON TAYLOR.

Witnesses:
 ED FULWILER,
 CARRIE JENKS.